Nov. 16, 1965 R. ADLER 3,218,563

ELECTRON BEAM PARAMETRIC AMPLIFIER WITH OPPOSED-DIRECTION SIGNAL AND IDLER WAVES

Original Filed April 6, 1959

INVENTOR
Robert Adler
BY Francis W. Crotty
ATTORNEY

United States Patent Office 3,218,563

Patented Nov. 16, 1965

3,218,563

ELECTRON BEAM PARAMETRIC AMPLIFIER WITH OPPOSED-DIRECTION SIGNAL AND IDLER WAVES

Robert Adler, Northfield, Ill., assignor to Zenith Radio Corporation, Chicago, Ill., a corporation of Delaware Continuation of application Ser. No. 804,249, Apr. 6, 1959. This application June 18, 1963, Ser. No. 289,461

3 Claims. (Cl. 330—4.7)

The present invention is directed to a parametric amplifying system employing the principles of interaction between an electron beam and circuits placed alongside such beam. This application is a continuation of co-pending application Serial Number 804,249 filed April 6, 1959, and now abandoned by Robert Adler, assigned to the same assignee as the present application, and which in turn is a continuation-in-part of co-pending application, Serial Number 738,546, filed May 28, 1958 under the name of Robert Adler and assigned to the assignee of the present application.

The parent case, in discussing amplifying devices of the general kind under consideration, recognizes that they may be of at least two different types; (1) those featuring transverse field effects, and (2) those employing longitudinal field effects. The subject matter to be considered herein has application only to the first-mentioned type.

As further explained in the parent case, the electrons in the electron beam, when subjected to the restoring force of the focusing field in transverse-field tubes, oscillate about their respective rest positions in the beam at a frequency referred to as the transverse resonant frequency or, for the particular case wherein focusing results from a magnetic field, as the cyclotron frequency. The electron motion of a beam in which electron resonance has been established may be modified in response to an applied signal to effect modulation of the beam by that signal and the specific characteristics of the electron wave resulting from the modulation are dependent upon the relation of the signal frequency to the electron-resonance frequency. More particularly, the phase velocity $u$ of the electron wave may be expressed in terms of the velocity $u_e$ of the electrons, the signal frequency $f_1$ and the electron-resonance frequency $f_e$ as follows:

$$u=u_e\frac{1}{1\pm\frac{f_e}{f_1}} \qquad (1)$$

For operating conditions in which the signal frequency is the same as the electron-resonant frequency, the phase velocity is infinite; for other frequency relations, the resulting phase velocity is slower or faster than the electron velocity.

For relative frequencies in which the denominator of the foregoing expression is greater than unity, or when the plus sign is used, a slow wave condition exists; whereas signal frequencies chosen to reduce the denominator to a value of less than unity, that is when the minus sign is used, establish fast wave conditions. The two conditions are significantly different in respect of energy transfer that may be obtained between the electron beam and a signal circuit adjacent the beam path. The fast wave condition, which is the only one to be considered herein, distinguishes itself in that the coupler by which the input signal is modulated on the beam effects an exchange by surrendering the input signal energy to the beam and concurrently extracting from the beam fast-wave noise components present on the beam as it passes through the field of influence of the coupler. For force of this exchange, the beam as it leaves the field of the coupler is modulated substantially only with fast-wave energy derived from the coupler, having surrendered to that coupler the fast-wave noise components which had previously been carried by the beam.

It may further be demonstrated that the fast electron wave condition may be either of two specifically different types. When the ratio $f_e/f_1$ is less than unity, or when the signal frequency exceeds the electron-resonance frequency, the fast wave is a forwardly moving wave but when this ratio is greater than unity, as when the signal frequency is less than the electron-resonance frequency, a backward moving electron wave results. The pattern of energy exchange between the coupler and electron beam is also specifically different for the two kinds of fast waves that may exist on the beam, that is to say, it is different as between the forwardly moving and backwardly moving fast waves where "forward" is considered to be in the direction of electron travel along the beam path toward the final electron collector and "backward" is the obverse direction. These concepts of the fast and slow electron beam waves and of the forward and backwardly moving types of fast waves are described in the parent application. The significant differences in the exchange of energy between a coupler and the electron beam for the forwardly and backwardly moving fast waves will be considered more particularly hereinafter.

While the interchange of energy in respect of the coupler and the electron beam has bi-directional properties, it may also be employed for a unidirectional transfer of energy from one to the other, if desired. In other words, it may be availed of to concurrently produce modulation of the electron beam by an input signal and to purge the beam of fast wave noise but, alternatively, it may serve merely to transfer energy from the beam to a coupling device serving primarily as an attenuator. For example, as explained in the parent application, devices of the type under consideration include a modulation expander to obtain a desired gain but as an incident to the modulation expansion an idler wave component is introduced on the electron beam which may be undesirable in the load circuit coupled to the amplifier. In such a case, particularly if the pumping frequency of the modulation expander is so related to the signal frequency that the idler wave is a backward moving fast wave, a coupler in the form of a helical transmission line may be coupled to the beam to suppress or attenuate components of the idler wave frequency. Such an attenuator is characterized by the fact that it is not critical as to dimensions and further has an improved bandwidth.

Accordingly, it is an object of the invention to provide a novel parametric amplifying system employing a coupling device for achieving an improved noise factor.

It is a particular object of the invention to provide an amplifying system featuring fast electron wave interaction of the type characterized by at least a backwardly moving electron wave component and having an improved coupling device for effecting energy transfer in respect of that component.

Another specific object of the invention is the provision of an improved coupling and/or attenuating device for use in an amplifying system of the parametric type.

Another particular object of the invention is to provide a coupling device for parametric amplifying apparatus which has improved bandwidth and increased freedom in respect of dimensional tolerances.

In one aspect of the invention, a parametric amplifying system features an electron source for projecting an electron beam along a predetermined path, means for creating in the path a field for establishing electron resonance in the beam and means for modulating the beam in response to an applied signal frequency. In order to achieve a desired level of amplification, there is a modulation expander disposed along the beam path for expanding the modulation of the beam. Still further along the beam path there is an output coupler for extracting the applied signal frequency from the beam.

The electron resonance frequency and the pumping frequency characteristic of the modulation expander are so related to the input signal frequency that the electron waves of the beam, corresponding to the signal and idler frequencies, move in opposed directions but with the same phase velocity. In this environment, the input coupler may take the form of a transmission line disposed along the beam path and having a propagation velocity equal to the phase velocity of the fast waves. It is terminated at one end in its characteristic impedance and is coupled at its opposite end to the input signal source but further it is constructed to have an electrical length corresponding to an odd integral multiple of quarter wave lengths of the interaction of the forward moving one of the fast waves. This coupling structure achieves two types of signal and noise energy interchange with the electron beam; the exchange in respect of the forwardly moving fast wave being dependent, for optimum operation, upon a predetermined length of the coupler in terms of interaction wave length but in respect of the backwardly moving fast wave being independent of interaction wave length as will be made clear hereinafter.

The foregoing and other objects of the invention, together with further advantages and benefits thereof, will be more clearly understood from the following description of particular embodiments thereof taken in conjunction with the annexed drawing in the several figures of which like components are designated by similar reference characters and in which.

Figures 1, 2, 3A, 3B, 3C, 3D, 3E, 3F, 4, 5:
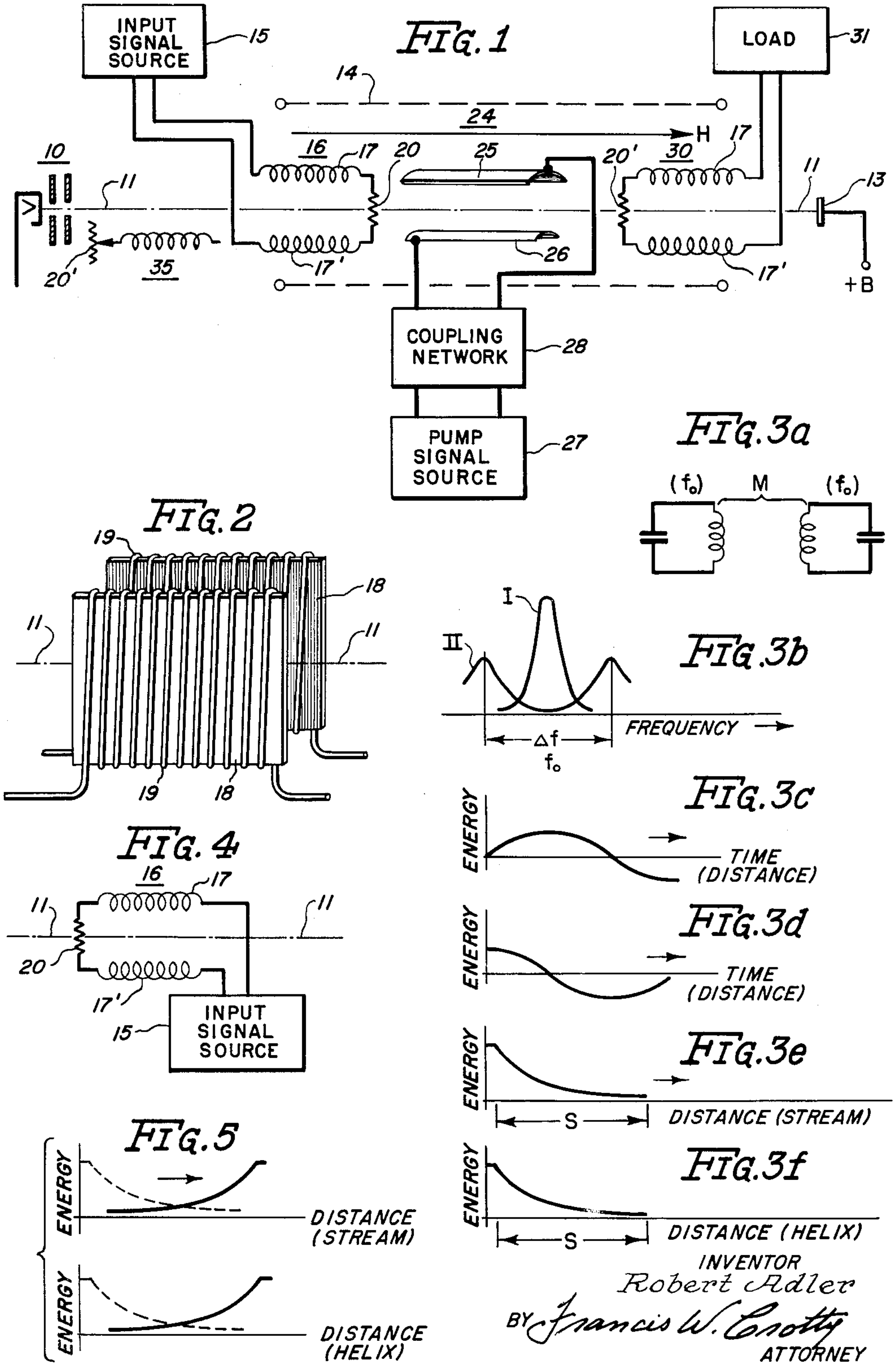
FIGURE 1 is a schematic representation of a parametric amplifying system incorporating principles taught in the aforesaid parent application.
FIGURE 2 represents structural details of one of the components of the system of FIGURE 1.

FIGURES 3*a*–3*f* represent a simplified electrical analogy of one form of coupler useful in the amplifier and also graphs utilized in explaining the mechanism of energy transfer between the electron beam and different types of couplers disposed therealong in coupling arrangement therewith;

FIGURE 4 is a schematic representation of a modified form of input coupler that may be employed in the amplifying system of FIGURE 1; and FIGURE 5 comprises graphs used in explaining the operation of this coupler.

The theory of operation and structural details of parametric amplifiers are fully described in the parent application which is incorporated herein by reference. Systems featuring operating conditions of infinite phase velocity of the fast electron wave as well as finite phase velocity of the fast electron wave, directed forwardly and travelling faster than the electron stream, are specifically dealt with both as regards structure and mode of operation. Accordingly, the representations of the figures annexed hereto are schematic and the structural description as well as mode of operation will be considered in much less detail in this text. Particular emphasis, however, will be given to the mechanism of energy transfer between the electron beam and various forms of coupling structures for both the forward moving and backward moving fast wave conditions.

Referring now more particularly to FIGURE 1, the arrangement there represented is similar to that shown in FIGURE 5*a* of the parent application. It comprises an electron source 10 for projecting an electron beam along a predetermined path, which path is designated by construction line 11, 11. The electron source 10 may be entirely conventional and preferably includes the usual cathode together with suitable focusing and accelerating electrodes for developing a well-defined beam or stream of electrons. Path 11 terminates in an electron collector or anode 13 disposed transversely of the path and biased at a suitable positive potential as indicated.

The amplifier has means for creating in the beam path a field for establishing electron resonance in the beam traversing that path. While electron resonance may be established through the agency of a magnetic or an electrostatic field, the arrangement in question is indicated as a solenoid 14 surrounding the beam path to establish lines of magnetic flux parallel thereto and of a strength establishing a selected cyclotron frequency for electron motion. The focusing field of the solenoid is indicated symbolically by arrow H.

Spaced along beam path 11 there are further means for modulating the electron beam in response to an applied signal frequency. This modulating means is an electron coupler capable of imparting energy to the beam in response to signal energy received from a source 15. While different forms of coupling structures may be employed in parametric type amplifiers, the system under consideration will be assumed as one in which the signal frequency is different from the electron resonance frequency in which case it is more appropriate and expedient to employ transmission-line type couplers as described in the parent application. Accordingly, the input coupler or modulator 16 is represented as comprising a pair of helical transmission lines 17, 17′ disposed on opposing sides of the beam path. Structurally, this portion of the coupler may take the form represented in FIGURE 2 where it is shown as two sheets of insulating material 18, 18 individually disposed on opposite sides of beam path 11 and each carrying a helical winding 19. Signal source 15, for this preferred balanced arrangement, is connected to one end of the transmission line pair 17, 17′ while the other end is electrically terminated by a resistor 20 which preferably is equal to the characteristic impedence of the transmission lines.

Amplification is attained in the parametric type of amplifier by means of a modulation expander for expanding the signal modulation of the beam. The modulation expander may take any of a variety of forms as explained in the parent application and its particular form is of no concern to the present invention. Accordingly, an expander of relatively simple construction has been selected merely for purposes of illustration. It comprises a pair of dissimilar in size, concentric conductive cylinder sections or electrodes 25, 26 disposed on opposite sides of beam path 11, electrode 25 curving toward and electrode 26 curving away from the beam path. Electrode 26 is smaller than electrode 25 so that a potential applied between them develops an inhomogeneous electrode field through which the beam path extends. The magnetic focusing field referred to hereinabove in conjunction with establishing electron resonance in the beam not only embraces the input coupler 16 but also the modulation expander 24 and further the output coupler or demodulator to be considered hereinafter. While such a field may result from the association of three separate solenoids individually associated with the input and output couplers as well as the expander, it is more convenient to make use of a single elongated solenoid as shown in the drawing. Energy from which the amplification is eventually derived is supplied by a driving signal or pumping signal generator 27 which produces an alternating signal field having a frequency different from the signal frequency. The pumping signal source is coupled to electrodes 25, 26 through a coupling network 28.

Still further along beam path 11, between modulation expander 24 and anode 13, is an output coupler 30 constituting means for extracting the applied signal from the beam for application to a load 31. Demodulator or output coupler 30 is identical in structure to input modulator 16 comprising helical transmission lines 17, 17′ and a matching resistive termination 20 at one end and a similar termination at the opposite end provided by the connection to load 31.

As thus far described, the system of FIGURE 1 is identical to that shown in FIGURE 5*a* of the parent application, modified to include the coupler in FIGURE 8 of the latter. In operation, an electron beam issued from source 10 enters the field of the input coupler or modulator 16 wherein it is modulated with the applied signal from source 15. If it be assumed that the applied signal frequency exceeds the electron resonance frequency of the beam, interaction of the beam and input modulator results in the establishment of a fast electron signal wave on the beam which has a finite velocity faster than the electron velocity and is, accordingly, a forwardly moving fast wave. The feature of removing fast electron noise from the beam concurrently with the modulation of the beam by the input signal which takes place in coupler 16 will be considered more particularly hereinafter; suffice it for the moment to recite that coupler 16 effects modulation of the beam with the input signal. The modulated beam experiences an expansion of its modulation by virtue of the inhomogeneous field established in modulation expander 24 under the influence of source 27 which field alternates at the pumping frequency. The modulation expansion realized here is an amplification of the applied signal so that the signal carried by the beam as it passes beyond expander 24 has, in effect, received an amplification. The amplified signal is extracted from the beam as it traverses demodulator or output coupler 30 and the amplified signal thus derived from the beam is delivered to load 31.

As an incident to the modulation expansion achieved in expander 24 an electron idler wave is developed on the beam as a modulation product of the pumping and signal frequencies. It has been assumed that the input signal frequency is greater than the electron resonance frequency so that the signal wave on the beam is a forwardly moving fast wave and it will be further assumed that the pumping frequency is so related to the applied signal frequency that the electron idler wave on the beam is a fast backward moving wave. In such a system it is highly desirable to remove signal components from the beam at the idler frequency and that is accomplished, in the arrangement of FIGURE 1, by a further or additional coupler 35.

This coupler, serving as an attenuator at the idler frequency, includes a helical transmission line disposed along the beam path between source 10 and modulation expander 24, preferably being located between source 10 and input coupler 16. It is designed to have a propagation velocity substantially equal to the phase velocity of the idler wave and will be assumed for present purposes to be an ideal lossless line preferably terminated in its characteristic impedance at the end adjacent electron source 10. Of course, one may use the balanced line arrangement of FIGURE 2 in constructing attenuator 35.

It will be recognized that the described system of FIGURE 1 features a fast electron wave of the forwardly moving type corresponding to the input signal and a fast wave of the backwardly moving type representing the idler wave, both being carried by the electron stream. Couplers 16 and 35 effect energy transfer of these waves, respectively, but the pattern or law of energy exchange is different in the two cases and the dimensional requirements and bandwidth of the couplers are likewise quite different. Their significant differences may be understood from a consideration of the wave phenomena and will be aided by homey analogies.

In an article entitled "Transverse-Field Travelling-Wave Tubes With Periodic Electrostatic Focusing" by Robert Adler et al., published in Proceedings of the IRE, volume 44, number 1, of January 1956 at pages 82–89, there is a mathematical treatment of the interaction process of the transverse electron waves on a stream which flows in a focusing field and a slow wave circuit capable of carrying a transverse electric field. The circuit wave and electron wave originally have the same propagation constant $\gamma$ and the authors explain that one would expect the propagation constant to be perturbed as a result of their interaction and in accordance with the following expression:

$$E=E_0 \exp. [j(wt-\gamma Z)+\alpha Z] \quad (2)$$

where $\alpha$ represents the perturbation in propagation constant and Z is a measure of distance in the direction of wave motion. The article shows that, so far as the forward moving fast electron wave is concerned, the input signal splits up into two waves of unchanging amplitude but modified velocity and the combined voltage on the slow wave circuit is:

$$V=V_1 \cos \alpha Z \quad (3)$$

where $V_1$ is the voltage applied to the slow wave circuit.

At some risk of over-simplification but in an effort to convey the wave condition and energy transfer concepts in terms of more common experience, one may liken the interaction of the forward moving fast signal wave on the beam and the signal wave on the slow circuit to the signal condition existing in a pair of tuned circuits resonant at the same frequency and having a mutual coupling M as represented in FIGURE 3*a*. For loose coupling of these circuits, values less than critical coupling, the response of the coupled circuits is the single peaked curve I centered about the common resonant frequency $f_0$. As the coupling is increased to and beyond the critical value, the single peak curve devolves into the double peak or saddle characteristic and for very large coupling factors may assume a shape similar to that of curve II. This condition is one where the response at the resonant frequency $f_0$ is indeed low while peak responses are experienced at two frequencies equi-distant from frequency $f_0$ and separated by an amount $\Delta f$ determined by the degree of coupling and the resonant frequency.

The distribution of amplitudes between the coupled circuits for the coupling condition represented by curve II is shown by the curves of FIGURES 3*c* and 3*d*. It is apparent from inspection of these curves that the amplitude variation is a sine function in one circuit and a cosine function in the other. Accordingly, there are intervals in which all of the energy appears first in one and then in the other of these circuits and these intervals are separated by 90 electrical degrees at the interaction or beat frequency $\Delta f$. In other words, there is an energy transfer or exchange between the circuits, taking place at the beat or interactive frequency $\Delta f$. The energy is found entirely in one circuit and 90 electrical degrees later it is found completely in the other circuit.

This same type of energy interchange occurs between the wave traversing the circuit and the fast forward wave on the electron stream. The energy transfer experienced therebetween may again be represented by the curves of FIGURES 3*c* and 3*d*, assuming the abscissa now to denote distance of wave travel in the directions indicated by the arrows. Once again, a complete exchange of energy occurs at spaced points in the direction of wave travel and, in terms of interaction or beat wavelength, these points have a spacing of one quarter wave length. Accordingly, for a complete interchange of energy, the length of coupler 16 must be proportioned in terms of the interaction or beat wave length. Specifically, it should be a quarter wave length or odd integral multiples of quarter wave lengths of the interaction or beat. The energy transfer phenomenon is bi-directional and energy is transferred from the circuit to the electron beam and vice versa. If the effective electrical length of the coupler is properly selected in terms of the interaction or beat a complete transfer is accomplished of the signal wave from the input coupler to the beam and of the fast wave noise or similar components from the beam to the coupler. Hence, the need for achieving close dimensional tolerances of coupler 16 is apparent when one takes into consideration optimum performance or energy interchange. It is also apparent that the dimensioning of the coupler in terms of interaction wave length restricts the energy exchange phenomenon to a narrow frequency band. This, however, is characteristic only of the coupler for the fast moving electron wave which is forwardly directed and is not the case for the coupler for the backwardly moving fast wave.

The aforementioned article further derives the following expression for $\alpha$, the perturbation in propagation constant:

$$\alpha^2=\frac{ZIwe}{8VD^2w_1} \qquad (4)$$

where Z is the characteristic impedance of a helical transmission line constituting the circuit, I is the D.C. beam current, V is the D.C. beam voltage, and D is the distance between the metallic surfaces of the circuit between which the electron stream flows. For the case of the backward wave, the current I flows opposite to the direction of wave propagation. Thus I is negative or less than 0 so that the expression for $\alpha^2$ is positive or greater than 0. Equation 2 now represents two exponentials, indicating that for the backwardly moving fast wave, there is a gain or loss per unit length for two waves, both having the same original velocity.

A graphical solution of the equation, showing the mechanism of energy interchange, is given in FIGURES 3*e* and 3*f*. Assume that the arrow indicates the direction of beam travel and that the circuit is coupled to the beam over an interaction distance S and consider the manner in which signal energy is exchanged from the beam to the coupler. The signal energy is strongest on the beam at the place where it enters the interaction space and the amount of energy given up by the beam is likewise greatest at the left-hand end of the coupler. As the stream traverses the coupler space, it continues to surrender energy to the coupler but in constantly diminishing amount because of the fact that the signal strength on the stream has decreased continuously from the instant the stream entered the field of the coupler. In other words, the energy exchange is an exponential function and the extent of exchange is dependent upon the length of the coupler and is independent of interaction wave length. If the coupler is long enough, the energy exchange will be substantially complete. Since the dimensions of the coupler are not necessarily related to interaction wave length, the energy exchange is effective over a wide band of frequencies. The energy surrendered by the beam appears in the coupler in the form of an exponentially growing wave which proceeds backwards toward the end of coupler 35 closest to the electron gun, to be absorbed by the terminating resistance 20'.

The mechanism of this energy interchange is similar to that of the counterflow industrial chemical processes found, for example, in heat exchangers. By way of illustration, consider a fluid system of the recirculating type in which a circulating liquid coolant must be cooled from time to time. The warm liquid is directed through a conduit which has good heat-exchange properties and which is surrounded by a water jacket conveying cold water in the opposite direction to the flow of the warm liquid. The warm liquid surrenders heat continuously to the cold water and, if the distance over which the liquids interact is sufficiently long, the coolant will be brought to the temperature of the cold water. Other things being equal, only the length of the interaction path need be selected for a particular degree of heat exchange.

Thus, coupler 35 which extracts energy from the electron stream in this manner is to be distinguished from coupler 16 and its mechanism of interaction. Coupler 35 has a length selected only as required to attain a desired degree of signal transfer from the electron stream; its electrical length is not dependent upon interaction wavelength and its bandwidth is wide by comparison.

In summary, the beam issuing from source 10 is modulated by input coupler 16 to develop a forwardly directed fast signal wave due to the interaction of the beam and the wave travelling along this circuit. The coupler is proportioned to the end that the applied signal energy is completely transferred to the beam while the beam transfers fast wave noise energy carried thereon to the coupler. Also the backward moving fast wave of the beam occurring at the idler frequency is extracted from the beam by attenuator-coupler 35 and is dissipated therein because of its damping termination. Aside from the idler-wave attenuator 35, this system is in all material respects the same as that represented in FIGURE 5*a* of the parent application.

The use of coupler 35 to extract unwanted backwardly directed fast wave signal components of the idler frequency from the stream takes advantage of the interaction of the stream with the coupler and is achieved even if the coupler is an ideal, lossless transmission line. In some instances it may be desirable to construct the line to be moderately lossy because that relaxes the tolerances on the termination of the line. If the line is an ideal one and if the termination does not establish a condition of impedance matching, multiple reflections of the signal components delivered up by the stream may result. Where that occurs, the unwanted components are remodulated on the beam. By constructing the line to be moderately lossy, this may be precluded even though the line termination does not provide precise impedance matching. The line may be made lossy by appropriate choice of the dielectric material from which it is constructed, by the use of small-diameter wire for the winding, or by separate resistance or conductance means.

The concept of an attenuator in the form of a transmission line coupled to the stream to damp out an unwanted signal component has been specifically described in the embodiment of FIGURE 1 in relation to the backwardly moving fast wave corresponding to the idler frequency but it is not in any sense necessarily restricted in its use to suppress this particular component or, in fact, to suppress backwardly moving fast waves carried by the beam. In a broader sense, this technique may be adapted to damp out or suppress any unwanted signal component carried by the beam, even such components as may be in the form of forwardly moving fast waves but in this case the line must, in general, be lossy. By way of illustration, an attenuator comprising a helical transmission line of the structure shown in FIGURE 2 may be positioned between beam source 10 and input coupler 16 to suppress forwardly moving fast noise waves on the beam so long as the helix has appropriate damping properties. Indeed, complete absorption for forwardly moving fast wave components is dependent upon optimizing the effective electrical length of the helical transmission line of the attenuator, but complete absorption is not always required. Such components establish standing waves on the coupler and if the helix is long enough and has adequate damping properties the standing wave of noise gradually decreases along its length.

Such noise components may also be suppressed by the use of more simple or lumped couplers, as explained in the parent application, but these devices require accurate impedance matching which is difficult to maintain for wide band operation. Any mismatch of such a coupler to the beam results in a reflection of the beam noise intended to be removed and the reflected noise re-enters the beam which is, of course, detrimental. The use of attenuators employing helical transmission lines as described has a distinct advantage over such other coupling devices. The damping properties of the helix serve to absorb the beam noise even though the noise of the helix is, at the same time, impressed upon the beam and must therefore be removed by the input signal coupler which the beam enters upon leaving the noise attenuator. It will be appreciated, however, that this noise contribution from the helix to the beam is at room temperature and is very much lower than beam noise which generally corresponds to a higher temperature. Since the secondary noise is at a much lower temperature, mis-matching is not as nearly as detrimental as in the case of lumped couplers. The use of the helical attenuator to absorb noise in the described fashion is attractive in parametric amplifying systems in which the pumping frequency is very much higher than the signal frequency, in which case it is most desirable to employ such an attenuator for suppressing beam noise at the idler wave frequency.

Another and closely related use of the described backward wave coupler suggests itself for parametric amplifiers in which the electron resonance frequency is high compared to the signal frequency. As explained above, this relation of frequencies results in a fast moving backwardly directed signal wave on the beam. In such an amplifier, the coupling of input signal source 15 to input coupler 16 is modified in the manner represented in FIGURE 4. Specifically, the helices 17, 17' of the coupler are terminated in their characteristic impedance by a resistor 20 coupled to the line terminals adjacent electron source 10 and input signal source 15 is coupled to the opposite terminals of the helices.

The pattern of energy exchange between input coupler and stream is represented in the curves of FIGURE 5. It corresponds to the counterflow example given above. For convenience, noise energy is represented by the broken-line curve and applied signal energy is represented by the full-line curve. The arrow denotes the direction of travel of the electron stream. The signal is applied to the right-hand end of the coupling helix and is transferred to the beam in accordance with an exponential function; concurrently, the fast wave noise components carried by the beam into the region of the coupler are transferred in exponential manner to the helix, leaving the same as the left-hand end. The extent of the energy exchange is limited only by length of the coupler. One particularly desirable feature of this arrangement is that if any beam noise transferred to the helix is reflected at the termination closest to electron source 10 because of an inappropriate impedance match, the reflected noise flows in a forward direction through the helix but since it has no interaction with the beam, it has no detrimental effect. Generally, the termination at the opposite end of the helix afforded by input source 15 will prevent any appreciable second reflection of noise which could traverse the helix in a direction to occasion interaction with the beam.

The amplifying system just described, utilizing the input modulator of FIGURE 4, has very useful practical applications. In the operation of parametric amplifiers, it is sometimes desirable that the idler wave be at a very high frequency with respect to the input signal frequency. The higher the idler frequency is with respect to the signal frequency, the better is the noise figure of the system for the reason that the power of the noise or unwanted signal components of the idler frequency is decreased in accordance with the ratio of the idler to signal frequencies. By way of example, a system of the type under consideration employed to amplify a received signal of 250 megacycles may utilize an electron resonance frequency of 900 megacycles and a pumping frequency at 1000 megacycles which would yield an idler frequency of 750 megacycles. The noise corresponding to the idler frequency, for this case, is reduced by 3 to 1, the ratio of the idler and signal frequencies. For operation at these frequencies, the modulation expander should preferably take the form of a twisted quadrupole structure like that described in a co-pending application of Glen Wade, Serial Number 747,764, filed July 10, 1958 and assigned to the present assignee, now abandoned expressly in favor of co-pending continuation application Serial Number 289,792 filed June 20, 1963 by the same applicant and assigned the same.

Another attractive application of the coupling structures described herein is an amplifying system featuring both forwardly and backwardly moving fast waves carried by the electron stream. The selection of the electron resonance frequency and the pumping frequency of the modulation expander may establish fast signal and idler waves moving in opposed directions on the beam but with the same phase velocity. In such a system, since the input coupler must accommodate both forwardly and backwardly directed fast waves, optimum performance in respect of noise reduction requires that the electrical length of the helix correspond to an odd integral multiple of quarter wave lengths of reaction of the forward moving one of the fast waves.

To consider a particular case, let it be assumed that the electron resonance frequency is higher than the signal frequency so that the signal wave on the beam is backwardly directed. By appropriate selection of the pumping frequency, the idler wave established on the beam may be a forwardly moving fast wave having the same phase velocity as the backwardly moving signal wave. In such a case, the input coupler may be precisely the same as that represented in FIGURE 4. However, its electrical length should be a quarter of the interaction wave length for the idler wave in order to obtain optimum noise cancellation in respect of the forwardly moving fast noise wave components. As to backwardly moving noise components, there may be adequate attenuation if this length of the helix in relation to the unit damping or absorption of the helix is adequate. Of course, some freedom of improving the attenuation is available by appropriate choice of the characteristic impedance of the helix at the two frequencies, as is apparent from Equation 4. If insufficient attenuation for backward moving fast waves results from the use of a coupler having an electrical length of one quarter of the interaction wave length, the coupler may be made one-half wave length longer which will surely provide adequate attenuation. The use of the input coupler in this fashion to effect modulation of the electron beam by the input signal and to concurrently suppress or attenuate components of the beam at the idler frequency is attractive in parametric amplifying systems in which the idler frequency is large compared to the signal frequency. It again takes advantage of the reduction of noise power of the idler by the ratio of the idler to the signal frequencies. Here, also, the modulation expander is preferably of the twisted quadrupole type disclosed in the above-identified Wade application.

It is well known that helices and similar transmission devices exhibit the phenomenon of dispersion; waves of different frequencies propagate at somewhat different velocities. It will be understood that the existence of such a velocity difference in no way precludes the utilization of the inventive principle just described, namely, the simultaneous use of backward and forward waves on the same transmission device to couple to signal and idler waves at the same time. The two velocities may not be the same, but the required numerical adjustments will be readily apparent to those skilled in the art.

In particular, let it be assumed that the same helix is to be used for coupling to the signal and idler waves and let it be further assumed that the idler frequency is higher: $f_i > f_s$. Having selected the two frequencies and also a helix, which may have dispersion or not, its phase velocities for these frequencies are $u_i$ and $u_s$. With these four parameters given, one can determine the required beam velocity $u_e$ and the electron resonance frequency $f_e$ as follows: (Note that the signal phase velocity $u_s$ would normally be negative except in the case of extreme dispersion.)

From Equation 1, it is known:

$$\frac{u_e}{u_s}=1-\frac{f_e}{f_s};\ \frac{u_e}{u_i}=1-\frac{f_e}{f_i} \qquad (5)$$

Hence $$u_e=u_s\left(1-\frac{f_e}{f_s}\right)=u_i\left(1-\frac{f_e}{f_i}\right) \qquad (6)$$

$$u_s - u_i = f_e\left(\frac{u_s}{f_s} - \frac{u_i}{f_i}\right) \quad (7)$$

$$f_e = \frac{u_s - u_i}{\frac{u_s}{f_s} - \frac{u_i}{f_i}} \quad (8)$$

Similarly, $$u_e = \frac{f_s - f_i}{\frac{f_s}{u_s} - \frac{f_i}{u_i}} \quad (9)$$

Equations 8 and 9 may be satisfied by adjustment of the focus field and the acceleration potential of the beam.

The following numerical examples in arbitrary units demonstrate the application of these equations in adjusting for two helices having widely different dispersion properties:

(A) for a helix having zero dispersion $$f_s = 2 \qquad u_s = -10$$
$$f_i = 6 \qquad u_i = +10$$
$$f_e = \frac{-10-10}{-5-\frac{5}{3}} = \frac{20}{\frac{20}{3}} = 3$$
$$u_e = \frac{+2-6}{-\frac{2}{10}-\frac{6}{10}} = \frac{-4}{-\frac{8}{10}} = +5$$

(B) for a helix having positive dispersion (higher phase velocity at $f_i$)

$$f_s = 2 \qquad u_s = -8$$
$$f_i = 6 \qquad u_i = +12$$
$$f_e = \frac{-8-12}{-\frac{8}{2}-\frac{12}{6}} = \frac{20}{6} = 3\frac{1}{3}$$
$$u_e = \frac{+2-6}{-\frac{2}{8}-\frac{6}{12}} = \frac{-4}{\frac{3}{4}} = 5\frac{1}{3}$$

Comparison of the values of $f_e$ and $u_e$ in the two cases shows that small adjustments (+11% in $f_e$ and +6.7% in $u_e$) have taken care of velocity changes of ±20% in idler and signal velocities.

In the foregoing text, reference has been made to forwardly and backwardly directed fast waves on the stream and, in order to avoid confusion, it must be understood that the reference here is to apparent wave motion. This is merely an abstraction or concept of wave pattern depicting relative phase velocity and the relation of phase velocity to significant frequencies in the system has been explained above. Necessarily, signal translation on the beam or the cause and effect of wave motion is unidirectional and is always forward as that expression has been defined herein.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A parametric amplifying system comprising: an electron source for projecting an electron beam along a predetermined path;
- means for creating in said path a field for establishing in said beam electron resonance at a predetermined resonance frequency;
- a source of input signal energy of a particular frequency;
- means disposed along a first portion of said path for modulating said beam in response to said input signal to establish thereon a fast electron signal wave;
- a modulation expander having a predetermined pumping frequency disposed along a second portion of said path beyond said first portion to expand the modulation of said beam and concurrently establish thereon a fast electron idler wave resulting as a modulation product of said pumping and signal frequencies, said resonance and pumping frequencies being so related to said input signal frequency that said fast signal and idler waves move in backward and forward directions, respectively, on said beam but with the same phase velocity and said beam-modulating means including a transmission line disposed along said path, having a propagation velocity substantially equal to the phase velocity of said fast waves, terminated in its characteristic impedance at the end closer to said electron source, coupled at its opposite end to said input signal source and having an electrical length corresponding to an odd integral multiple of quarter wave lengths of interaction of the forward moving one of said fast waves;
- and means disposed along a third portion of said path beyond said second portion for extracting said input signal from said beam.

2. A parametric amplifying system comprising:
- an electron source for projecting an electron beam along a predetermined path with a velocity $u_e$;
- means for creating in said path a field for establishing in said beam electron resonance at a predetermined resonance frequency $f_e$;
- a source of input signal energy of a particular frequency $f_s$;
- means disposed along a first portion of said path for modulating said beam in response to said input signal to establish thereon a fast electron signal wave having a phase velocity $u_s$;
- a modulation expander having a predetermined pumping frequency disposed along a second portion of said path beyond said first portion to expand the modulation of said beam and concurrently establish thereon a fast electron idler wave having a frequency $f_i$ and a phase velocity $u_i$ resulting as a modulation product of said pumping and signal frequencies, said resonance and pumping frequencies being so related to said input signal frequency that said fast signal and idler waves move in opposed directions on said beam and said beam-modulating means including a transmission line disposed along said path, having propagation velocities $u_s$ and $u_i$ at said signal and idler frequencies respectively, terminated in its characteristic impedance at one end, coupled at its opposite end to said input signal source and having an electrical length corresponding to an odd integral multiple of quarter wave lengths of interaction of the forward moving one of said fast waves;
- means disposed along a third portion of said path beyond said second portion for extracting said input signal from said beam and said electron resonance frequency and beam velocity being adjusted in accordance with the expressions:

$$f_e = \frac{u_s - u_i}{\frac{u_s}{f_s} - \frac{u_i}{f_i}}$$

and $$u_e = \frac{f_s - f_i}{\frac{f_s}{u_s} - \frac{f_i}{u_i}}$$

respectively.

3. A system for parametrically amplifying input signal energy of a predetermined frequency comprising:
- an electron source for projecting an electron beam along a predetremined path;

means for creating in said path a field establishing in said beam electron resonance at an assigned resonance frequency;

a source of input signal energy of said predetermined frequency;

a modulation expander having a predetermined pumping frequency and disposed along a portion of said path to expand input signal modulation of said beam and concurrently establish thereon a fast electron idler wave resulting as a modulation product of said pumping and signal frequencies with said resonance and pumping frequencies being so related to said input signal frequency that fast signal and idler waves move in opposed directions on said beam;

means disposed along said path between said electron source and said modulation expander for modulating said beam in response to said input signal energy to establish thereon a fast electron signal wave and including a distributed circuit having in one direction a propagation constant at the input signal frequency corresponding to a propagation velocity substantially equal to the phase velocity of said signal wave and in the other direction having a propagation constant at the idler wave frequency corresponding to a propagation velocity substantially equal to the phase velocity of said idler wave;

and means disposed along said path for extracting amplified signal energy from said beam.

References Cited by the Examiner

UNITED STATES PATENTS

| | | | |
|---|---|---|---|
| 2,811,673 | 10/1957 | Kompfner | 338—81 |
| 2,911,558 | 11/1959 | Currie | 315—3.6 |

ROY LAKE, *Primary Examiner.*